Sept. 28, 1954 E. S. POMYKALA 2,690,494
SPOT WELDING METHOD
Filed June 5, 1950
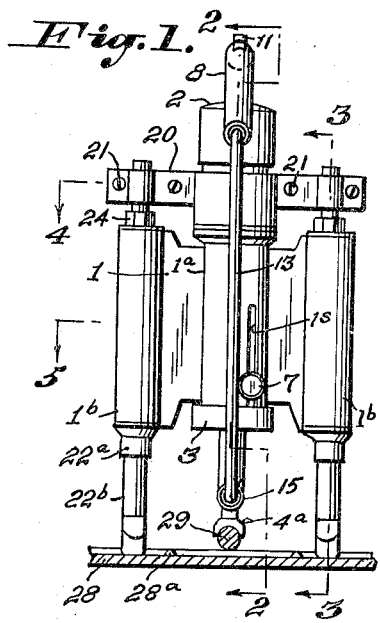
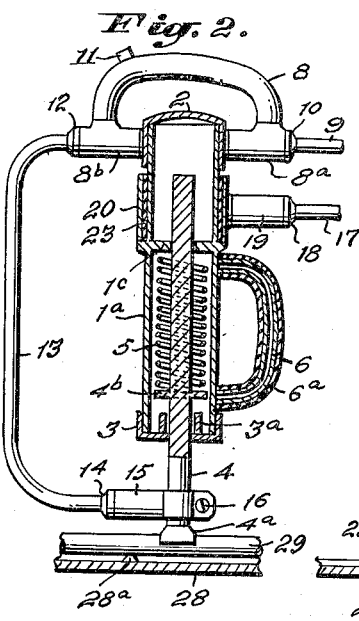
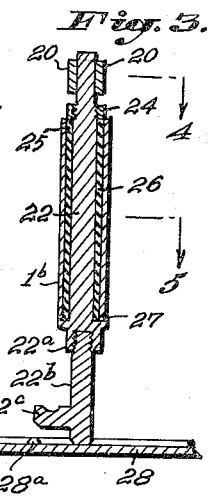
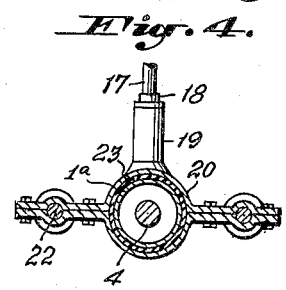
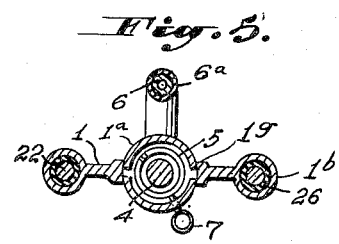
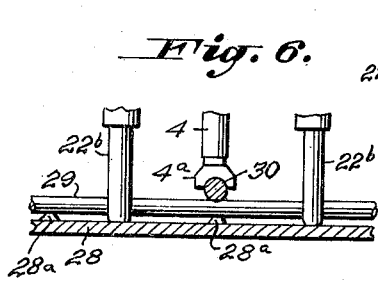
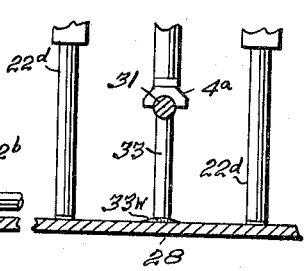
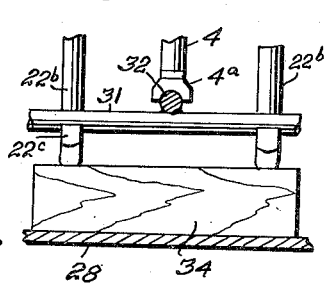
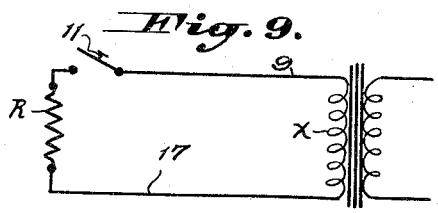
INVENTOR,
Edmund S. Pomykala
BY
Henry C. Parker Patented Sept. 28, 1954

2,690,494

UNITED STATES PATENT OFFICE 2,690,494

SPOT WELDING METHOD

Edmund S. Pomykala, Mobile, Ala.

Application June 5, 1950, Serial No. 166,141

4 Claims. (Cl. 219—10)

This invention relates to spot welding method. Primarily it concerns welding rods or similar members to each other and to plates by the electrical resistance method. In particular the method is designed for constructing underground storage tanks and like structures as shown in my U. S. Patent 2,382,171 and further U. S. patent applications Serial Numbers 574,147, filed January 23, 1945, now Patent No. 2,558,580, and 589,923, filed April 23, 1945, now Patent No. 2,531,742.

The art of spot welding is not new. It is used to a great extent in the manufacturing industry. It is based on sending an electrical current through the metals in contact, heating and melting of the metals to be welded at the point of contact by the resistance which this point offers to the passage of electrical current. Heretofore this has been accomplished by sending the current through suitable electrodes on the opposite sides of the section of metals to be welded. In constructing tanks and similar structures in the field this method becomes fairly slow, laborious and somewhat costly, and so a simpler method is devised whereby the current is sent through electrodes which are for all practical purposes on the same side of the section of the metals to be joined by welding. This is accomplished by having three electrodes one positive and two negative. The current flowing at low voltage from the positive electrode to the rod or similar member to be welded, thence through the resistance contact with the other metal, from this metal to the two negative electrodes and the circuit is completed.

Since the areas of contact of base metals to be welded are purposely localized and are small in extent, they offer great resistance to passage of electrical current. The area of contact in the immediate vicinity of the electrodes becomes rapidly heated to melting and the weld made under pressure.

In the accompanying drawing

Figure 1 is a front elevation of the spot welder used in my method.

Figure 2 is a vertical section taken on lines 2—2 in Figure 1.

Figure 3 is a vertical section taken on lines 3—3 in Figure 1.

Figure 4 is a horizontal section taken on lines 4—4 in Figures 1, 2, 3.

Figure 5 is a horizontal section through the welder approximately at its mid point taken on lines 5—5 in Figures 1, 2, 3.

Figure 6 is an arrangement of the electrodes for cross welding one rod to another after the lower rod is welded to the plate.

Figure 7 is an arrangement of the electrodes for cross welding a rod to a stud after the stud has been welded to underlying plate.

Figure 8 is an arrangement of the electrodes for cross welding one rod to another in forming a welded mat.

Figure 9 is a diagram of the basic electrical circuit used.

In all views similar numerals or numerals and letters designate similar parts.

Numeral 1 designates the main spot welder frame. This may be made of sheet metal with various components assembled by welding, or it may be cast and machined. Preferably it is made of stainless steel but other metals may be used.

$1a$ designates the main operating tube or cylinder; it contains the positive electrode 4, which is movable and slidable within the cylinder; being controlled by manual pressure on the coiled spring 5. This coiled spring reacts between discs $4b$ and $1c$. Disc $4b$ which is cast with electrode 4 slides up and down in the cylinder or tube $1a$, being guided by grooves $1g$ which engage small lugs attached to disc $4b$. Additional control and adjustment for electrode 4 is secured by means of plastic or otherwise insulated knob 7 which is attached to disc $4b$. This knob slides and is controlled by slot $1s$. This knob control is useful for adjusting electrode 4 manually for welding mats particularly as shown in Fig. 8.

Top cap 2 fits over cylinder $1a$, and 3 designates a bottom cap with integral lugs $3a$, the purpose being to stop the downward motion of disc $4b$; both caps 2 and 3 are preferably attached to tube $1a$ through a screw connection. Positive electrode or tong 4, is roughly cylindrical in shape having a disc $4b$ integrally cast, and a tip or shoe $4a$ which is detachable being attached through a screw connection. Shoe $4a$ may be made in a variety of shapes depending on the metal shapes to be welded. As shown here it is recessed for round rods, but other shapes may be readily used.

Electrode 4 together with the shoe $4a$ is preferably made of high conductivity metal like copper. Welded or otherwise attached to cap 2, are two arms $8a$ and $8b$, which are combined electrical receptacles and supports for main control handle 8. 6 designates a secondary handle attached laterally to tube $1a$. Both handles 6 and 8 are heavily insulated as shown typically by $6a$ for handle 6 in Fig. 5.

The electrical energy is taken in through a flexible insulated cable 9, plug 10, through cable and switch within handle 8, spring switch being controlled by push button 11, which preferably is mounted on top of handle 8 largely off center.

Plug 12 slides within receptacle 8b and makes contact with cable in handle 8. A short section of flexible cable 13 connects plugs 12 and 14. Plug 14 slides within receptacle 15, which makes firm contact with electrode 4. Receptacle 15 is held firmly in position on electrode 4 by friction, being adjusted by set screw 16. The current flowing through the electrode 4, then tip 4a which has ample surface of contact bearing on rod 29 shown in Figs. 1 and 2. The current flows through the rod 29 and through the point of contact with ridged or corrugated plate 28 at corrugation 28a; here because of the high resistance of contact the metals are rapidly heated to melting and the weld is made under pressure. The same result could be achieved by having corrugations on the rod rather than on the plate. To continue the circuit further the current flows through the plate and then through the contact between the plate and negative electrodes 22b. Negative electrodes or tongs 22b may be made in various sizes and shapes. Basically they are stub rods being threaded at upper end for attachment within electrode sleeve 22a. They may be cast with recessed spurs 22c which are offset as shown in Figs. 1, 3, and 8 or rolled plain. Sleeve 22a is cast integrally with main negative electrode 22. Negative electrodes are completely insulated from main frame by insulation 25, 26 and 27 shown in Fig. 3. Electrodes 22 are held firmly in position in frame tube 1b by means of hexagonal nuts 24 which screw over and bear on insulating washers 25. The current is taken off at the top of electrodes 22 through twin bent bus bars 20 which are clamped in position by set screws 21. Bus bars are insulated from main framing by sleeve insulation 23.

At the back of the rear bus bar, there is attached by welding, brazing or otherwise a receptacle 19, which receives negative plug 18 attached to flexible cable 17. Both cables lead to standard control apparatus and take off current from main source of supply through transformers. The operating voltage of the spot welder is fairly low, about 5 or 10 volts. The current however is heavy.

Figures 1 and 2 shows arrangement of spot welder for welding rod to corrugated plate. Arrangement for welding a corrugated rod to a smooth plate would be similar.

Figure 6 shows arrangement of electrodes for welding cross rod 30 to an underlying rod 29 which has formerly been welded to the plate.

Figure 7 shows an arrangement of electrodes for welding rod 31 to stud 33 which has formerly been welded to plate at 33w.

Figure 8 shows an arrangement for welding cross rod 32 to rod 31 at some distance away from the plate.

34 designates a temporary blocking.

If vertical stud 33 is in the immediate vicinity, welding of rod 32 to rod 31 can be secured by an arrangement similar to Figure 7, so dispensing with temporary blocking.

Figure 9 is a diagram of basic electric circuit used, wherein X is the transformer for stepping down the voltage of the main supply which normally would be about 220 volts. This voltage is stepped down to about 5 volts. The current is transmitted through cables 9 and 17; it is controlled by push button switch 11 and the weld is made at resistance R, which is the point of contact of the base members to be welded.

Although the welder is developed primarily for constructing underground storage and similar structures as outlined above, the methods shown illustrate some of the varied possibilities. However, it is felt this is only an outline and the field may be greatly enlarged.

Having described the general features of my process, it is believed that others skilled in the art may make changes in details without departing from the spirit of this invention or the scope of the appended claims.

I claim:

1. In the resistance welding of metal rods to a supporting corrugated base plate which contacts the rods only at the corrugations, making use of a hand-operated portable spot welder having a central positive electrode adapted to be resiliently pressed against the rod to be welded and provided with a pair of negative electrodes mounted in spaced-parallel relationship on either side of the positive electrode, said negative electrodes being adapted to be pressed against the base plate during the welding operation; the process which comprises pressing the positive electrode against a rod in the immediate vicinity of a point where the rod contacts the plate, then pressing the negative electrodes against the base plate on either side of said point, passing welding current through the positive electrode, through the rod, through the contact between the rod and the plate and then through the plate to the negative electrodes, thereby fusing the metal at said contact point and welding the rod to the plate; all electrodes being positioned on the same side of the plate as the work.

2. In the resistance welding of metal rods to other spaced metal rods which previously have been welded at spaced points to a supporting corrugated plate, making use of a portable hand-operated spot welder having a central positive electrode adapted to be resiliently pressed against the rod to be welded and provided with a pair of negative electrodes mounted in spaced-parallel relationship on either side of the positive electrode, said negative electrodes being adapted to be pressed against the base plate during the welding operation; the process which comprises pressing the positive electrode against a cross rod at a point where said cross rod contacts a welded rod and close to a point where the welded rod is welded to the base plate, then pressing the negative electrodes against the base plate on either side of said point, passing welding current through the positive electrode, through the cross rod, through the contact point, through the welded rod, through the welded point and through the base plate to the negative electrodes, thereby fusing the metal at said contact point and welding the cross rod to the welded rod; all electrodes being positioned on the same side of the plate as the work.

3. In the resistance welding of metal rods to studs which have been welded to an underlying base plate, making use of a portable spot welder having a central positive electrode adapted to be resiliently pressed against the rod to be welded and provided with a pair of negative electrodes mounted in spaced-parallel relationship on either side of the positive electrode, said negative electrodes being adapted to be pressed against the base plate during the welding operation; the process which comprises holding a rod on top of one of said studs, pressing the positive electrode against the rod directly above a stud, then pressing the negative electrodes against the base plate on either side of said stud, passing the welding current through the positive electrode, through the contact point between the rod and the stud, then through the stud and through the base plate to the negative electrodes, thereby fusing the metal at said contact point and welding the rod to the stud; all electrodes being positioned on the same side of the plate as the work.

4. In the resistance welding of metal rods to an underlying metal base plate which contacts the rods only at spaced points, making use of a hand-operated portable spot welder having a central positive electrode adapted to be resiliently pressed against the rod to be welded and provided with a pair of negative electrodes mounted in spaced-parallel relationship on either side of the positive electrode, said negative electrodes being adapted to be pressed against the base plate during the welding operation; the process which comprises pressing the positive electrode against a rod in the immediate vicinity of a point where the rod contacts the plate, then pressing the negative electrodes against the base plate on either side of said point, passing welding current through the positive electrode, through the rod, through the contact between the rod and the plate and then through the plate to the negative electrodes, thereby fusing the metal at said contact point and welding the rod to the plate; all electrodes being positioned on the same side of the plate as the work.

References Cited in the file of this patent

UNITED STATES PATENTS

| Number | Name | Date |
|---|---|---|
| 516,312 | Lemp et al. | Mar. 13, 1894 |
| 2,256,480 | Hughes | Sept. 23, 1941 |
| 2,307,026 | Grecca | Jan. 5, 1943 |
| 2,332,022 | Southwick | Oct. 19, 1943 |
| 2,442,448 | Zimmerman | June 1, 1948 |